United States Patent [19]
Neitzel et al.

[11] 3,726,965
[45] Apr. 10, 1973

[54] PRODUCTION OF LANGBEINITE FROM A POTASSIUM MAGNESIUM SULFATE SALT AND MAGNESIUM SULFATE

[75] Inventors: Ulrich E. G. Neitzel, Ogden; Frederick J. Andreasen, Brigham City, both of Utah

[73] Assignee: Irving Trust Company, Ogden, Utah

[22] Filed: Feb. 19, 1971

[21] Appl. No.: 116,871

[52] U.S. Cl. ................423/551, 423/155, 423/179, 423/544, 423/554
[51] Int. Cl. ..........C01d 5/12, C01d 5/00, C01f 5/40
[58] Field of Search........................23/128, 121, 117; 423/551, 554, 544, 155, 179

[56] References Cited
UNITED STATES PATENTS

| | | | |
|---|---|---|---|
| 2,881,050 | 4/1959 | Autenrieth | 23/117 |
| R24,890 | 10/1960 | Burke | 23/128 |
| 3,207,576 | 9/1965 | Marullo et al. | 23/121 |
| 3,617,243 | 11/1971 | Neitzel | 23/121 |

*Primary Examiner*—Edward Stern
*Attorney*—David V. Trask, Harvey Gold and William S. Britt

[57] ABSTRACT

A process for producing langbeinite comprising reacting a solid potassium magnesium sulfate salt and magnesium sulfate at temperatures above about 350° C. Potassium magnesium sulfate salts such as schoenite ($K_2SO_4 \cdot MgSO_4 \cdot 6H_2O$) or leonite ($K_2SO_4 \cdot MgSO_4 \cdot 4H_2O$) when admixed with magnesium sulfate, for example, a magnesium sulfate hydrate such as epsomite ($MgSO_4 \cdot 7H_2O$), and heated to temperatures above 350° C produce a substantially anhydrous, non-hygroscopic reaction product which is substantially pure langbeinite ($K_2SO_4 \cdot 2MgSO_4$) when at least equimolar quantities of the potassium magnesium sulfate salt and magnesium sulfate are utilized and the reaction is carried to completion.

16 Claims, 1 Drawing Figure

PATENTED APR 10 1973
3,726,965
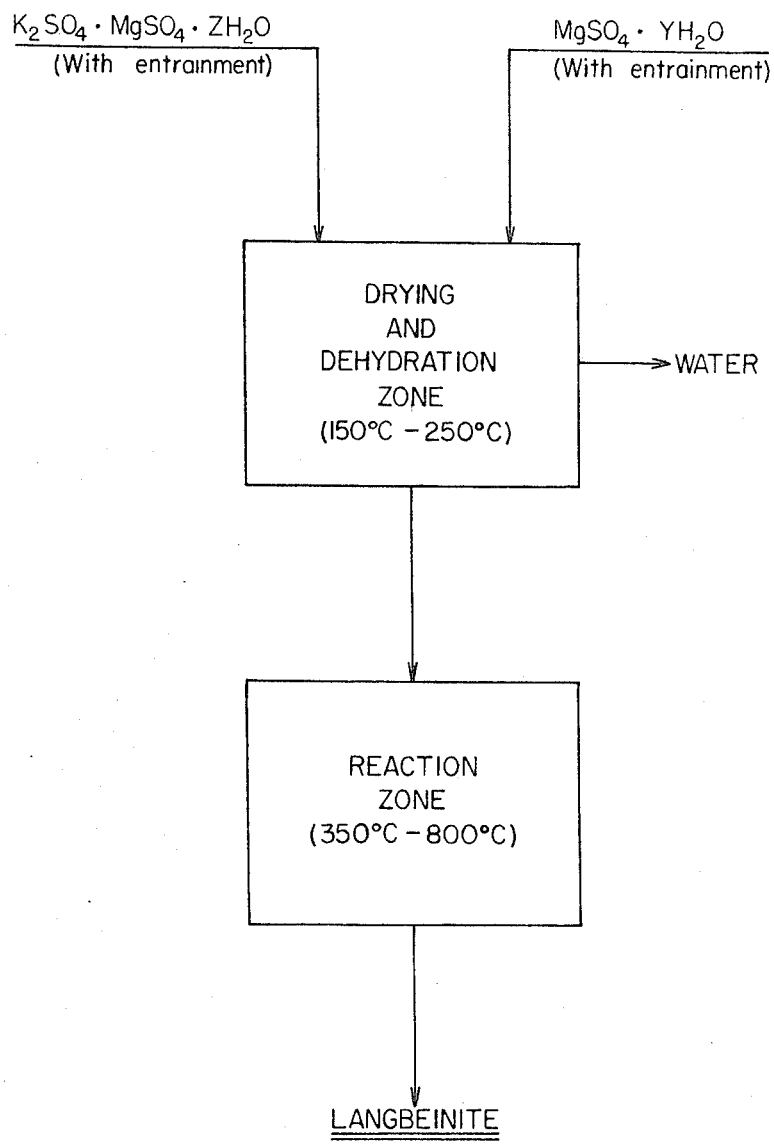
INVENTORS
ULRICH E. G. NEITZEL
FREDERICK J. ANDREASEN
BY
*William S. Britt*
ATTORNEY 3,726,965

PRODUCTION OF LANGBEINITE FROM A POTASSIUM MAGNESIUM SULFATE SALT AND MAGNESIUM SULFATE

BACKGROUND OF THE INVENTION

1. Field

Langbeinite is increasingly used as a non-chloride, soluble potassium magnesium fertilizer. Commerical langbeinite has an MgO value of about 18 to 19 percent by weight and a $K_2O$ value of about 22 to 25 percent by weight. It possesses low hygroscopicity and contains substantially no water of hydration. Langbeinite is found as a solid mineral in salt water deposits and is generally produced by aqueous extraction. This invention relates to the formation of langbeinite from basic salts obtained by solar evaporation of natural brines or from by-products of the potash industry.

2. State of the Art

Langbeinite is found as a naturally occurring mineral in salt water deposits in the southwestern United States, especially southeastern New Mexico. Langbeinite ores generally contain large quantities of halite and smaller quantities of sylvite as impurities. Production of commercially pure grades of langbeinite involves the removal of impurities such as halite and sylvite. One technique for purifying langbeinite ore deposits is described in U.S. Pat. No. 3,215,509 of Adams. Crude langbeinite ore is ground into a coarse fraction and a fine fraction, a coarse fraction being contacted with an aqueous liquid to dissolve all of the halite impurities therefrom and the clean coarse langbeinite recovered therefrom. The resulting liquor is then used to treat the fine fraction of crude langbeinite to dissolve the halite therefrom and the fine commerically pure langbeinite is separated therefrom. The double-stage washing process of Adams is designed to conserve leach water, however, single stage leaching of crude langbeinite to remove impurities is described in Atwood et al., U.S. Pat. No. 3,436,175.

The preparation of langbeinite as an intermediate product is described in U.S. Pat. No. 3,415,620 of Scarfi, et al. Raw kainite is reacted with a magnesium sulfate containing brine at a temperature of about 100° C to form solid phase langbeinite, sodium chloride and langbeinite brine. The langbeinite material attained in the Scarfi process is treated between 20° and 40° C with sulfate brine to yield a schoenite brine containing a solid phase of schoenite or leonite and potassium chloride.

Langbeinite is also produced as an intermediate product and a process for converting kainite to potassium sulfate. Marullo et al., U.S. Pat. No. 3,207,571, treat schoenite at temperatures of about 150° C to about 170° C at a pressure from about 5 to 7 absolute atmospheres with magnesium sulfate liquor to yield langbeinite and langbeinite mother liquor. The langbeinite obtained is treated with a sulfate mother liquor at a temperature below 67° C to yield schoenite and a magnesium sulfate mother liquor.

From the art known to applicant it is evident that the production of commerical grades and quantities of langbeinite has been dependent upon leaching of a pure product from ores containing a substantial quality of crude langbeinite or from the aqueous reaction of potassium magnesium sulfate salts and a magnesium sulfate brine to yield langbeinite as a solid phase in a langbeinite brine. These processes require, therefore, a source of crude langbeinite or the use of large quantities of water to produce a langbeinite liquor.

SUMMARY OF THE INVENTION

A novel method for producing langbeinite by the high temperature solid-phase reaction of a potassium magnesium-sulfate salt and magnesium sulfate has now been invented. Hydrated potassium magnesium salts such as schoenite or leonite can be utilized by admixing with a magnesium sulfate mineral such as kieserite, epsomite or other hydrated magnesium sulfate material, and heated to a temperature of at least 350° C to produce langbeinite. The reaction is advantageous inasmuch as minerals such as schoenite, leonite, and magnesium sulfate which are very hygroscopic in a dehydrated state, can be converted to the non-hydrated mineral, langbeinite, which can be stored substantially indefinitely without substantial absorption of water.

The process of this invention is a straight-forward, high temperature, solid-state reaction of a simple potassium magnesium sulfate salt and magnesium sulfate to produce langbeinite in substantially 100 percent yields. The reactants are preferably free from impurities such as sodium salts and chloride salts. The reactants may be utilized in any degree of dryness, that is, the reactants may be hydrates and may further contain substantial quantities of free water.

Langbeinite is produced according to the practice of this invention by intimate admixing of appropriate quantities of a potassium magnesium sulfate salt such as schoenite, leonite, or equivalent salt and magnesium sulfate, usually in a hydrated form such as kieserite or epsomite or the like and heated to a temperature of above about 350° C although preferably less than the melting temperature of the mixture for a period of time sufficient to convert substantially all the reactants to langbeinite. A temperature of above about 600° C is preferred to obtain a rapid reaction and a short residence time.

The process stoichiometrically requires equimolar quantities of the potassium magnesium sulfate salt ($K_2SO_4 \cdot 4$) and magnesium sulfate ($MgSO_4$). Although the reaction proceeds favorably whenever excesses of either reactant are present, it is generally preferred that the potassium magnesium sulfate be present in excess.

Although the temperature required to initiate reaction between a potassium magnesium sulfate salt such as schoenite and magnesium sulfate has been found to be at leaast 350° C, drying and/or dehydration of a reactant may be conducted at lower temperatures if desired. For example, wet, hydrated reactants can be handled by heating the reactants individually or an admixture thereof at a temperature of about 150° C to about 250° C for a sufficient period of time to dry and/or dehydrate the reactants. Alternatively, wet, hydrated reactants may be heated directly to 350° C where drying or dehydration occurs either before or substantially simultaneously with reaction. Drying and reacting of the reactants is preferably conducted with agitation and in the presence of an air-stream to carry away evaporated water.

The present invention is particularly adaptable to various solar evaporation processes wherein schoenite, leonite, and hydrated magnesium sulfate are frequently products or by-products of the process. Processes for producing commercial grades of schoenite are well known in the industry. In U.S. Pat. No. 2,902,344 of Cevidalli et al., U.S. Pat. No. 2,902,343 of Saccardo, and U.S. Pat. No. 3,207,576 of Marullo et al. there is provided descriptions of processes for producing schoenite in solid and aqueous form from kainite. In copending application of Ryan, Duyster, Lukes, and Neitzel, U.S. Patent application Ser. No. 799,376, there is provided a description of an improved process for producing schoenite which is substantially free from sodium chloride impurity from a solar harvest which include potassium-containing double salts of magnesium sulfate, halite and epsomite. The descriptions provided in the above patents and applications are herein incorporated by reference.

Magnesium sulfate can be recovered from bitterns resulting from solar pond evaporation of potassium salt brines. The bitterns brine contains magnesium chloride and magnesium sulfate in recoverable amounts. In copending application Ser. No. 867,336 of Neitzel and Flint there is set forth a description of an improved process for recovering solid bischofite ($MgCl_2 \cdot 6H_2O$) and solid hydrated magnesium sulfate ($MgSO_4 \cdot 5/4 H_2O$). The description of this process is hereby incorporated by reference to the above application.

The advantage of the instant invention is that it provides a non-aqueous system for reacting magnesium potassium sulfate salts and magnesium sulfate to produce langbeinite. It is further advantageous inasmuch as a source of natural langbeinite is not required. The non-aqueous process is desirable inasmuch as it dries and dehydrates reactants substantially simultaneously with the reaction which produces an anhydrous, non-hygroscopic product. Contrastingly, langbeinite produced by an aqueous process must be dried to remove free water present. The invention is further advantageous inasmuch as it utilizes by-products from solar brine recovery processes and provides a means for producing a product having utility in the fertilizer industry which is not hydrated and is substantially non-hygroscopic.

A product with a chemical composition of langbeinite could be obtained by merely mixing dehydrated schoenite ($K_2SO_4 \cdot MgSO_4$) and dehydrated epsomite ($MgSO_4$) and chemically mixing the two minerals to yield a product having two moles of magnesium sulfate and one mole of potassium sulfate present. Such a mixture, however, readily picks up moisture again if exposed to humid atmosphere, slowly converting to the original hydrated materials. A mixture of hydrated schoenite and hydrated epsomite contains approximately 36 percent by weight of water and precludes economic marketing of the material inasmuch as shipping costs become quickly prohibitive.

DESCRIPTION OF THE DRAWINGS

A single FIGURE of the drawings is a flow-sheet illustrating those steps presently regarded as the best mode for carrying out the invention.

DESCRIPTION OF THE ILLUSTRATED EMBODIMENT

As illustrated, a potassium magnesium sulfate salt is introduced into a drying and dehydration zone along with magnesium sulfate. As indicated hereinabove, both of these salts may be hydrates and may contain substantial quantities of free moisture. In a preferred practice of the invention, schoenite or leonite is attained from by-products of solar evaporation ponds of potassium and sodium containing brines and admixed with substantially equimolar quantities of artificial kieserite or epsomite, also obtained as by-products of solar evaporation of brines. The residence time in the drying and dehydration zone depends upon the wetness of the feed materials, the state of hydration and the temperatures maintained in the drying and dehydration zone. As indicated hereinabove, the drying and dehydration zone may be an integral part of the reaction zone so that drying and dehydration is conducted substantially simultaneously with reaction of the feed materials. However, if a separate drying and dehydration zone is maintained the residence time therein may be varied greatly inasmuch as the feed materials may be fed to the reaction zone at various states of dryness or dehydration. Thus, residence in the drying zone may vary from a few minutes up to 20 minutes or more.

After the reactants have been dried they are introduced into an admixing and reaction zone in which a minimum temperature of about 350° C is maintained. For practical purposes, an upper temperature limit of about 800° C is preferred inasmuch as the reactants and reaction product tend to melt above that temperature although the reaction may be conducted with molten materials if desired. The residence time of materials in the reaction zone depends upon the state of dryness and dehydration of the reactants and the temperature maintained in the reaction zone. If the materials are thoroughly dry and dehydrated upon introduction to the reaction zone then a residence time of about ten minutes may be maintained under maximum temperature conditions. A very high yield of langbeinite is attained under these conditions although acceptable products are produced even though a shorter residence time is maintained. It is generally preferred that the residence time be sufficient to allow the reaction to proceed to completion at the imposed temperature.

A preferred manner of practicing the invention involves heating the reactants in a rotary dryer. The product obtained from a rotary dryer is granular or pelletized, which is a desirable form. Although powdery material is a useful fertilizer form, granular material is easier to handle since very little dusting occurs and there is little tendency to cake.

A high yield of langbeinite is obtained under conditions of this invention. It is generally preferred that an excess of the potassium mangesium salt be provided so that a minimum amount of magnesium sulfate as a free salt is found in the reaction product. The general equation for the invention is believed to be as follows:

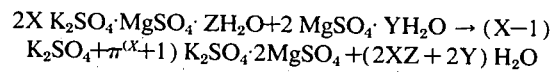

In the above equation when X equals 1 and the reaction is carried to completion, pure langbeinite is produced. The following table shows a composition for values of X from 0.9 to 1.5.

TABLE

Composition of Langbeinite Products

| Factor X | Percent MgO | Weight Percent K₂O |
|---|---|---|
| 0.9 | 19.81 | 22.05 |
| 1.0 | 19.43 | 22.68 |
| 1.1 | 19.05 | 23.31 |
| 1.2 | 18.7 | 23.85 |
| 1.3 | 18.42 | 24.33 |
| 1.4 | 18.1 | 24.75 |
| 1.5 | 17.92 | 25.13 |

The commerical langbeinite products on the market generally have a guaranteed minimum of 18 percent magnesium oxide and 22 percent by weight of potassium oxide. A product falling within the commerical market specifications can readily be obtained by this invention whenever X has a value of about 0.9 to about 1.4. Inasmuch as the instant invention advantageously utilizes by-products from solar evaporation of brine, it is preferred that substantially equimolar quantities of the reactants be utilized and that a slight excess of the potassium magnesium sulfate salt be present. The invention is preferably carried out with a value for X of about 1.1 to 1.2.

It is to be understood that the invention may be conducted with substantial excesses of a potassium magnesium salt present. The presence of great excesses of a potassium magnesium sulfate salt, such as schoenite, tends to shift the reaction in favor of producing greater quantities of potassium sulfate in the ultimate product, thereby obtaining a product which is a mixture of langbeinite and potassium sulfate. Inasmuch as potassium sulfate is not substantially hygroscopic, it does not tend to degrade the reaction product in a manner similar to presence of magnesium sulfate.

Inasmuch as a primary object of this invention is to provide a substantially non-hydrated, non-hygroscopic product, an excess of the magnesium sulfate reactant is generally not preferred since free $MgSO_4$ in the end product absorbs water. Theoretically, about 10 percent excess $MgSO_4$ can be used to produce commercial grade langbeinite. However, excess $MgSO_4$ reactant is practicable only when a low hydration salt such as kieserite is utilized. Epsomite, for example, with seven moles of water of hydration per mole of $MgSO_4$ readily absorbs substantial quantities of water when dehydrated and can be tolerated in the langbeinite end product only in very small quantities. The greatest advantages obtained from this invention are realized, therefore, when X in the above equation equals at least one.

Although the objects of this invention has been set forth herein in terms of producing commerical grade langbeinite, it is to be understood that it is possible to duplicate the composition of naturally occurring langbeinite having the following composition:

| Mg | 11.72 % by weight |
| K | 18.84 % by weight |
| SO₄ | 69.44 % by weight |

The invention is further illustrated by the following examples.

EXAMPLE I

One and one-tenth tons of schoenite containing ten percent of free moisture and 0.62 tons of epsomite containing ten percent by weight of free moisture, each obtained as by-products of a solar evaporation process for brines, were admixed and fed to a rotary dryer. The admixed materials were heated counter-currently with hot air at an average temperature of about 600° C for a period of about 30 minutes. One ton of product was obtained which did not show any of the qualities or characteristics of schoenite or magnesium sulfate hydrates. The product was analyzed and determined to be substantially langbeinite.

EXAMPLE II

One and one-tenth tons of Schoenite containing 10 percent by weight free moisture and 0.4 tons of artificial kieserite ($MgSO_4 \cdot 5/4H_2O$) containing 20 percent by weight free moisture were admixed and fed to a rotary dryer. The materials were heated counter-currently in hot air at an average temperature of about 600° C for a period of about 30 minutes. One ton of product was obtained which was substantially anhydrous and non-hygroscopic. The product was determined to be langbeinite.

Although the invention has been described hereinabove with reference to specific examples and embodiments, it is not intended to be limited solely thereto but to include all the variations and modifications falling within the scope of the appended claims.

We claim:

1. A method of producing substantially anhydrous langbeinite comprising reacting in a solid-state reaction, a solid potassium magnesium sulfate salt ($K_2SO_4 \cdot MgSO_4$) and solid, magnesium sulfate at temperatures above about 350° C.

2. The method of claim 1 wherein the reactants are present in a predetermined molar ratio to produce a langbeinite product having MgO values of about 18 to 19 percent by weight and K₂O values of about 22 to about 25 percent by weight.

3. The method of claim 1 wherein the potassium magnesium sulfate salt is hydrated.

4. The method of claim 3 wherein the hydrated potassium magnesium sulfate salt is schoenite, leonite or admixtures thereof.

5. The method of claim 1 wherein the magnesium sulfate is hydrated.

6. The method of claim 5 wherein the hydrated magnesium sulfate is artificial kieserite, epsomite or admixtures thereof.

7. The method of claim 1 wherein the potassium magnesium sulfate salt is present in at least equimolar quantities.

8. The method of claim 3 wherein the hydrated potassium magnesium sulfate salt is heated sufficiently to at least partial dehydration before being reacted with magnesium sulfate.

9. The method of claim 1 wherein the reactants are agitated while being heated at temperatures between about 350° and 800° C.

10. The method of claim 7 wherein the reaction is continued until substantially no free magnesium sulfate is present.

11. The method of claim 1 wherein the reaction is conducted continuously having reactants continuously enter a reaction zone and langbeinite product continuously discharge from said reaction zone.

12. The method of claim 11 wherein the reactants are heated by the counter-current flow of hot gases through said reaction zone.

13. The method of claim 7 wherein the molar ratio of potassium magnesium sulfate salt to magnesium sulfate is from about 1.1:1 to about 1.2:1.

14. The method of claim 1 wherein the temperature is maintained above about 600° C.

15. The method of claim 1 wherein the potassium magnesium sulfate salt and magnesium sulfate are heated in a rotary dryer.

16. The method of claim 1 wherein the molar ration of potassium magnesium sulfate salt to magnesium sulfate is about 0.9:1 to about 1.5:1.

* * * * *